(12) United States Patent
Kamada et al.

(10) Patent No.: US 11,635,587 B2
(45) Date of Patent: Apr. 25, 2023

(54) IMAGING LENS INCLUDING SEVEN LENSES OF +--+0+, +--+-+-, +---+- OR +--++- REFRACTIVE POWERS

(71) Applicant: TOKYO VISIONARY OPTICS CO., LTD., Tokyo (JP)

(72) Inventors: Kenichi Kamada, Tokyo (JP); Masaya Hashimoto, Fukushima (JP)

(73) Assignee: TOKYO VISIONARY OPTICS CO., LTD., Tokyo (JP)

(*) Notice: Subject to any disclaimer, the term of this patent is extended or adjusted under 35 U.S.C. 154(b) by 197 days.

(21) Appl. No.: 16/851,984

(22) Filed: Apr. 17, 2020

(65) Prior Publication Data

US 2021/0063696 A1 Mar. 4, 2021

(30) Foreign Application Priority Data

May 13, 2019 (JP) .............................. JP2019-090476

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2016/0154214 A1 | 6/2016 | Ishizaka |
| 2020/0271897 A1* | 8/2020 | Huh .................... G02B 27/0025 |

FOREIGN PATENT DOCUMENTS

| CN | 204359999 U | 5/2015 |
| CN | 105116519 A | 12/2015 |
| CN | 205679843 U | 11/2016 |
| CN | 107015347 A | 8/2017 |
| CN | 107300751 A | 10/2017 |
| CN | 107664819 A | 2/2018 |
| CN | 107678134 A | 2/2018 |

OTHER PUBLICATIONS

Office Action issued in Chinese Patent Application No. 202010403002.0, dated Jun. 2, 2021 (7 pages).

* cited by examiner

*Primary Examiner* — Wen Huang
(74) *Attorney, Agent, or Firm* — Hamre, Schumann, Mueller & Larson, P.C.

(57) ABSTRACT

There is provided an imaging lens with excellent optical characteristics which satisfies demand of wide field of view, low profile and low F-number. An imaging lens comprising in order from an object side to an image side, a first lens with positive refractive power having a convex object-side surface in a paraxial region, a second lens with negative refractive power in a paraxial region, a third lens with negative refractive power in a paraxial region, a fourth lens with positive or negative refractive power in a paraxial region, a fifth lens, a sixth lens with positive refractive power in a paraxial region, and a seventh lens with negative refractive power having a concave image-side surface in a paraxial region, and predetermined conditional expressions are satisfied.

6 Claims, 6 Drawing Sheets

IMAGING LENS INCLUDING SEVEN LENSES OF +−+0+, +−+−+−, +−−+− OR +−++− REFRACTIVE POWERS

The present application is based on and claims priority of a Japanese patent application No. 2019-090476 filed on May 13, 2019, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN105116519A) discloses an imaging lens comprising, in order from an object side, a first lens with positive refractive power having a convex object-side surface and a concave image-side surface, a second lens with refractive power having a concave image-side surface, a third lens with refractive power having a concave object-side surface, a fourth lens with refractive power, a fifth lens with refractive power, a sixth lens with refractive power and a seventh lens with refractive power having a convex object-side surface and a concave image-side surface in a paraxial region, and a relationship between a focal length of the overall optical system and a focal length of the first lens satisfies a certain condition.

SUMMARY OF THE INVENTION

However, in lens configurations disclosed in the Patent Document 1, when a wide field of view, a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low profile and the low F-number in well balance and excellently corrects aberrations.

Regarding terms used in the present invention, "a convex surface", "a concave surface" or "a plane surface" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having a convex object-side surface in a paraxial region, a second lens with negative refractive power in a paraxial region, a third lens with negative refractive power in a paraxial region, a fourth lens with positive or negative refractive power in a paraxial region, a fifth lens, a sixth lens with positive refractive power in a paraxial region and a seventh lens with negative refractive power having a concave image-side surface in a paraxial region.

According to the imaging lens having an above-described configuration, the first lens achieves reduction in a profile of the imaging lens by strengthening the refractive power. Furthermore, when the first lens has the object-side surface being convex in the paraxial region, spherical aberration and distortion are properly corrected.

The second lens properly corrects the spherical aberration, chromatic aberration, coma aberration, astigmatism and distortion.

The third lens properly corrects the chromatic aberration, the astigmatism and the distortion.

The fourth lens properly corrects the coma aberration, the astigmatism and the distortion.

The fifth lens properly corrects the astigmatism, field curvature and the distortion.

The sixth lens properly corrects the coma aberration, the astigmatism, the field curvature and the distortion while maintaining a low profile.

The seventh lens properly corrects the chromatic aberration, the astigmatism, the field curvature and the distortion. Furthermore, when the image-side surface of the seventh lens is concave in the paraxial region, a back focus can be secured while maintaining the low profile.

According to the imaging lens having the above-described configuration, it is preferable that the first lens has an image-side surface being concave in the paraxial region.

When the first lens has the image-side surface being concave in the paraxial region, the astigmatism and the distortion can be properly corrected.

According to the imaging lens having the above-described configuration, it is preferable that the second lens has an object-side surface being convex in the paraxial region.

When the second lens has the object-side surface being convex in the paraxial region, the spherical aberration, the coma aberration, the astigmatism and the distortion can be properly corrected.

According to the imaging lens having the above-described configuration, it is preferable that the sixth lens has an object-side surface being convex in the paraxial region.

When the sixth lens has the object-side surface being convex in the paraxial region, the coma aberration, the astigmatism, the field curvature and the distortion can be properly corrected.

According to the imaging lens having the above-described configuration, it is preferable that the object-side surface of the sixth lens is formed as an aspheric surface having at least one pole point in the position off the optical axis.

When the object-side surface of the sixth lens is formed as the aspheric surface having at least one pole point in the position off the optical axis, the astigmatism, the field curvature and the distortion can be more properly corrected.

According to the imaging lens having the above-described configuration, it is preferable that the image-side surface of the seventh lens is formed as an aspheric surface having at least one pole point in the position off the optical axis.

When the image-side surface of the seventh lens is formed as the aspheric surface having at least one pole point in the position off the optical axis, the astigmatism, the field curvature and distortion can be more properly corrected, and a light ray incident angle to the image sensor can be properly controlled.

According to the imaging lens having the above-described configuration, it is preferable that the following conditional expression (1) is satisfied:

$$0.55 < vd2/vd3 < 1.50 \tag{1}$$

where
vd2: an abbe number at d-ray of the second lens, and
vd3: an abbe number at d-ray of the third lens.

The conditional expression (1) defines an appropriate range of the abbe numbers at d-ray of the second lens and the third lens. By satisfying the conditional expression (1), the chromatic aberration can be properly corrected.

According to the imaging lens having the above-described configuration, it is preferable that the following conditional expression (2) is satisfied:

$$0.30 < r2/f < 2.70 \tag{2}$$

where
r2: a paraxial curvature radius of an image-side surface of the first lens, and
f: a focal length of the overall optical system of the imaging lens.

The conditional expression (2) defines an appropriate range of the paraxial curvature radius of the image-side surface of the first lens. By satisfying the conditional expression (2), the astigmatism and the distortion can be properly corrected.

According to the imaging lens having the above-described configuration, it is preferable that the following conditional expression (3) is satisfied:

$$1.85 < |r13|/f \tag{3}$$

where
r13: a paraxial curvature radius of an object-side surface of the seventh lens, and
f: a focal length of the overall optical system of the imaging lens.

The conditional expression (3) defines an appropriate range of the paraxial curvature radius of the object-side surface of the seventh lens. By satisfying the conditional expression (3), the astigmatism and the distortion can be properly corrected.

According to the imaging lens having the above-described configuration, it is preferable that the following conditional expression (4) is satisfied:

$$0.65 < T2/T4 < 3.00 \tag{4}$$

where
T2: a distance along the optical axis from an image-side surface of the second lens to an object-side surface of the third lens, and
T4: a distance along the optical axis from an image-side surface of the fourth lens to an object-side surface of the fifth lens.

The conditional expression (4) defines an appropriate range of a relationship between the distance along the optical axis from the image-side surface of the second lens to the object-side surface of the third lens and the distance along the optical axis from the image-side surface of the fourth lens to the object-side surface of the fifth lens. By satisfying the conditional expression (4), the third lens and the fourth lens are arranged at optimum positions, respectively, and aberration correction function of these lenses becomes more effective. As a result, reduction in a profile can be achieved and the coma aberration, the astigmatism and the distortion can be properly corrected.

According to the imaging lens having the above-described configuration, it is preferable that the following conditional expression (5) is satisfied:

$$f3/f < -3.50 \tag{5}$$

where
f3: a focal length of the third lens, and
f: a focal length of the overall optical system of the imaging lens.

The conditional expression (5) defines an appropriate range of refractive power of the third lens. By satisfying the conditional expression (5), negative refractive power of the third lens becomes appropriate, and the chromatic aberration, the astigmatism and the distortion can be properly corrected.

According to the imaging lens having the above-described configuration, it is preferable that the following conditional expression (6) is satisfied:

$$0.60 < r4/f < 1.20 \tag{6}$$

where
r4: a paraxial curvature radius of an image-side surface of the second lens, and
f: a focal length of the overall optical system of the imaging lens.

The conditional expression (6) defines an appropriate range of the paraxial curvature radius of the image-side surface of the second lens. By satisfying the conditional expression (6), the astigmatism and the distortion can be properly corrected.

According to the imaging lens having the above-described configuration, it is preferable that the following conditional expression (7) is satisfied:

$$1.50 < |r5|/f < 6.80 \tag{7}$$

where
r5: a paraxial curvature radius of an object-side surface of the third lens, and
f: a focal length of the overall optical system of the imaging lens.

The conditional expression (7) defines an appropriate range of the paraxial curvature radius of the object-side surface of the third lens. By satisfying the conditional expression (7), the astigmatism and the distortion can be properly corrected.

According to the imaging lens having the above-described configuration, it is preferable that the following conditional expression (8) is satisfied:

$$0.90 < |r6|/f < 9.00 \tag{8}$$

where
r6: a paraxial curvature radius of an image-side surface of the third lens, and
f: a focal length of the overall optical system of the imaging lens.

The conditional expression (8) defines an appropriate range of the paraxial curvature radius of the image-side surface of the third lens. By satisfying the conditional expression (8), the astigmatism and the distortion can be properly corrected.

According to the imaging lens having the above-described configuration, it is preferable that the following conditional expression (9) is satisfied:

$$9.00 < vd3 < 39.00 \quad (9)$$

where
vd3: an abbe number at d-ray of the third lens.

The conditional expression (9) defines an appropriate range of the abbe number at d-ray of the third lens. By satisfying the conditional expression (9), the chromatic aberration can be properly corrected.

According to the imaging lens having the above-described configuration, it is preferable that the following conditional expression (10) is satisfied:

$$9.00 < vd5 < 39.00 \quad (10)$$

where
vd5: an abbe number at d-ray of the fifth lens.

The conditional expression (10) defines an appropriate range of the abbe number at d-ray of the fifth lens. By satisfying the conditional expression (10), the chromatic aberration can be properly corrected.

According to the imaging lens having the above-described configuration, it is preferable that the following conditional expression (11) is satisfied:

$$0.40 < (T1/TTL) \times 100 < 1.80 \quad (11)$$

where
T1: a distance along the optical axis from an image-side surface of the first lens to an object-side surface of the second lens, and
TTL: a total track length.

The conditional expression (11) defines an appropriate range of the distance along the optical axis between the first lens and the second lens. By satisfying the conditional expression (11), reduction in the profile of the imaging lens can be achieved and the astigmatism and the distortion can be properly corrected.

According to the imaging lens having the above-described configuration, it is preferable that the following conditional expression (12) is satisfied:

$$1.85 < (T4/TTL) \times 100 < 8.00 \quad (12)$$

where
T4: a distance along the optical axis from an image-side surface of the fourth lens to an object-side surface of the fifth lens, and
TTL: a total track length.

The conditional expression (12) defines an appropriate range of the distance along the optical axis between the fourth lens and the fifth lens. By satisfying the conditional expression (12), reduction in the profile of the imaging lens can be achieved and the astigmatism and the distortion can be properly corrected.

According to the imaging lens having the above-described configuration, it is preferable that the following conditional expression (13) is satisfied:

$$0.03 < T1/T2 < 0.25 \quad (13)$$

where
T1: a distance along the optical axis from an image-side surface of the first lens to an object-side surface of the second lens, and T2: a distance along the optical axis from an image-side surface of the second lens to an object-side surface of the third lens.

The conditional expression (13) defines an appropriate range of a relationship between the distance along the optical axis from the image-side surface of the first lens to the object-side surface of the second lens and the distance along the optical axis from the image-side surface of the second lens to the object-side surface of the third lens. By satisfying the conditional expression (13), the second lens is arranged at an optimum position, and aberration correction function of the lens becomes more effective. As a result, reduction in the profile can be achieved and the astigmatism and the distortion can be properly corrected.

According to the imaging lens having the above-described configuration, it is preferable that the following conditional expression (14) is satisfied:

$$0.25 < r2/r3 < 2.00 \quad (14)$$

where
r2: a paraxial curvature radius of an image-side surface of the first lens, and
r3: a paraxial curvature radius of an object-side surface of the second lens.

The conditional expression (14) defines an appropriate range of the paraxial curvature radius of the image-side surface of the first lens and the paraxial curvature radius of the object-side surface of the second lens. By satisfying the conditional expression (14), refractive powers of the image-side surface of the first lens and the object-side surface of the second lens can be appropriately balanced. As a result, the chromatic aberration, the coma aberration, the astigmatism and the distortion can be properly corrected.

According to the imaging lens having the above-described configuration, it is preferable that the following conditional expression (15) is satisfied:

$$0.15 < |r6/r7| < 3.20 \quad (15)$$

where
r6: a paraxial curvature radius of an image-side surface of the third lens, and
r7: a paraxial curvature radius of an object-side surface of the fourth lens.

The conditional expression (15) defines an appropriate range of a relationship between the paraxial curvature radius of the image-side surface of the third lens and the paraxial curvature radius of the object-side surface of the fourth lens. By satisfying the conditional expression (15), refractive powers of the image-side surface of the third lens and the object-side surface of the fourth lens can be appropriately balanced. As a result, the coma aberration, the astigmatism and the distortion can be properly corrected.

According to the imaging lens having the above-described configuration, it is preferable that the following conditional expression (16) is satisfied:

$$1.75 < |r7|/f \quad (16)$$

where
r7: a paraxial curvature radius of an object-side surface of the fourth lens, and
f: a focal length of the overall optical system of the imaging lens.

The conditional expression (16) defines an appropriate range of the paraxial curvature radius of the object-side surface of the fourth lens. By satisfying the conditional expression (16), the astigmatism and the distortion can be properly corrected.

According to the imaging lens having the above-described configuration, it is preferable that the following conditional expression (17) is satisfied:

$$0.20 < r11/f < 1.75 \qquad (17)$$

where
r11: a paraxial curvature radius of an object-side surface of the sixth lens, and
f: a focal length of the overall optical system of the imaging lens.

The conditional expression (17) defines an appropriate range of the paraxial curvature radius of the object-side surface of the sixth lens. By satisfying the conditional expression (17), the coma aberration, the astigmatism, the field curvature and the distortion can be properly corrected.

According to the imaging lens having the above-described configuration, it is preferable that the following conditional expression (18) is satisfied:

$$0.45 < |r12|/f < 20.50 \qquad (18)$$

where
r12: a paraxial curvature radius of an image-side surface of the sixth lens, and
f: a focal length of the overall optical system of the imaging lens.

The conditional expression (18) defines an appropriate range of the paraxial curvature radius of the image-side surface of the sixth lens. By satisfying the conditional expression (18), the coma aberration, the astigmatism, the field curvature and the distortion can be properly corrected.

According to the imaging lens having the above-described configuration, it is preferable that the following conditional expression (19) is satisfied:

$$0.60 < D1/bf < 1.20 \qquad (19)$$

where
D1: a thickness of the first lens along the optical axis, and
bf: a back focus.

The conditional expression (19) defines an appropriate range of a relationship between the thickness of the first lens along the optical axis and the back focus. By satisfying the conditional expression (19), the thickness of the first lens along the optical axis and the back focus can be appropriately balanced. As a result, reduction in the profile is achieved and formability of the first lens is improved. Furthermore, the coma aberration and the distortion can be properly corrected.

According to the imaging lens having the above-described configuration, it is preferable that the following conditional expression (20) is satisfied:

$$0.40 < D4/T4 < 3.50 \qquad (20)$$

where
D4: a thickness of the fourth lens along the optical axis, and
T4: a distance along the optical axis from an image-side surface of the fourth lens to an object-side surface of the fifth lens.

The conditional expression (20) defines an appropriate range of a relationship between the thickness of the fourth lens along the optical axis and the distance along the optical axis from the image-side surface of the fourth lens to the object-side surface of the fifth lens. When a value is below the upper limit of the conditional expression (20), the thickness of the fourth lens along the optical axis can be prevented from being too large, and the distance along the optical axis from the image-side surface of the fourth lens to the object-side surface of the fifth lens can be prevented from being too small. On the other hand, when the value is above the lower limit of the conditional expression (20), the thickness of the fourth lens along the optical axis can be prevented from being too small, and formability of the lens is improved. Furthermore, the distance along the optical axis from the image-side surface of the fourth lens to the object-side surface of the fifth lens can be prevented from being too large. As a result, it becomes favorable for reducing the profile, a light ray incident angle to the object-side surface of the fifth lens can be appropriately controlled, and the astigmatism and the distortion can be properly corrected.

According to the imaging lens having the above-described configuration, it is preferable that the following conditional expression (21) is satisfied:

$$0.20 < D4/D7 < 1.65 \qquad (21)$$

where
D4: a thickness of the fourth lens along the optical axis, and
D7: a thickness of the seventh lens along the optical axis.

The conditional expression (21) defines an appropriate range of a relationship between the thickness of the fourth lens along the optical axis and the thickness of the seventh lens along the optical axis. By satisfying the conditional expression (21), the thicknesses of the fourth lens and the seventh lens along the optical axis can be appropriately balanced. As a result, reduction in the profile can be achieved, and formability of the fourth lens and the seventh lens is improved. Furthermore, the astigmatism and the distortion can be properly corrected.

According to the imaging lens having the above-described configuration, the it is preferable that the following conditional expression (22) is satisfied:

$$1.90 < |f4|/f \qquad (22)$$

where
f4: a focal length of the fourth lens, and
f: a focal length of the overall optical system of the imaging lens.

The conditional expression (22) defines an appropriate range of the refractive power of the fourth lens. By satisfying the conditional expression (22), the coma aberration, the astigmatism and the distortion can be properly corrected.

Effect of Invention

According to the present invention, there can be provided an imaging lens with high resolution which satisfies demand of the wide field of view, the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9 and 11 are schematic views of the imaging lenses in Examples 1 to 6 according to the embodiments of the present invention, respectively.

The imaging lens according to the present embodiment comprises, in order from an object side to an image side, a first lens L1 with positive refractive power having a convex object-side surface in a paraxial region, a second lens L2 with negative refractive power in a paraxial region, a third lens L3 with negative refractive power in a paraxial region, a fourth lens L4 with positive or negative refractive power in a paraxial region, a fifth lens L5, a sixth lens L6 with positive refractive power in a paraxial region and a seventh lens L7 with negative refractive power having a concave image-side surface in a paraxial region.

A filter IR such as an IR cut filter and a cover glass are arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having the object-side surface being convex and an image-side surface being concave in a paraxial region (near the optical axis X). Therefore, reduction in a profile is achieved and spherical aberration, astigmatism and distortion are properly corrected by strengthening the refractive power.

The second lens L2 has the negative refractive power and is formed in a meniscus shape having an object-side surface being convex and an image-side surface being concave in a paraxial region (near the optical axis X). Therefore, the spherical aberration, chromatic aberration, coma aberration, the astigmatism and the distortion are properly corrected.

The third lens L3 has the negative refractive power and is formed in a meniscus shape having an object-side surface being convex and an image-side surface being concave in a paraxial region (near the optical axis X). Therefore, the chromatic aberration, the astigmatism and the distortion are properly corrected.

Figure 9:
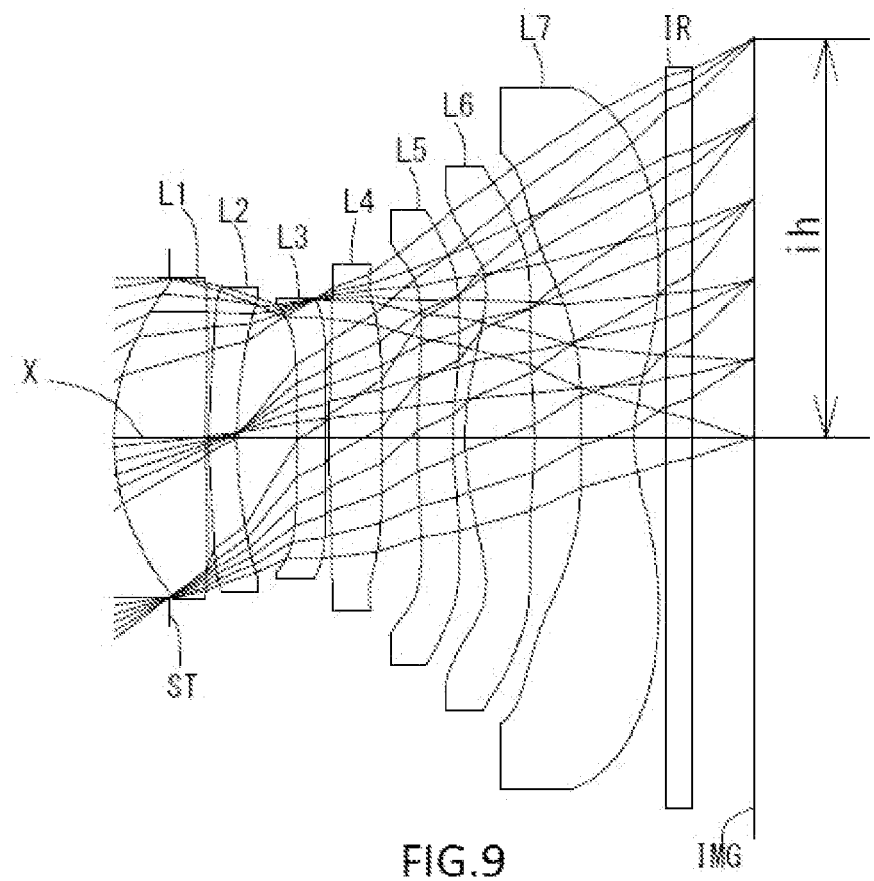
FIG. 9 is a schematic view showing an imaging lens in Example 5 according to the present invention.

The third lens L3 may be formed in a meniscus shape having the object-side surface being concave and the image-side surface being convex in a paraxial region (near the optical axis X) as in the Example 5 shown in FIG. 9. In this case, a light ray incident angle to the third lens L3 can be appropriately controlled, and the astigmatism and the distortion can be properly corrected.

The fourth lens L4 has the positive refractive power and is formed in a biconvex shape having an object-side surface being convex and an image-side surface being convex in a paraxial region (near the optical axis X). Therefore, reduction in the profile is achieved by positive refractive power on the both sides, and the coma aberration, the astigmatism and the distortion are properly corrected. Furthermore, when the both-side surfaces are convex, curvatures are suppressed from being large, and sensitivity to a manufacturing error can be reduced.

Figure 3:
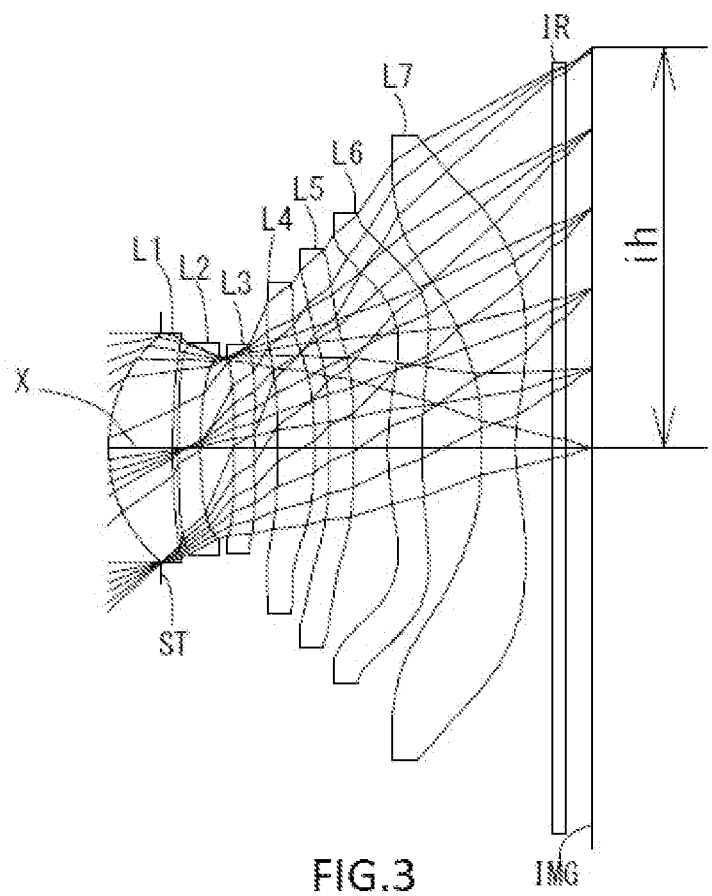
FIG. 3 is a schematic view showing an imaging lens in Example 2 according to the present invention.
Figure 5:
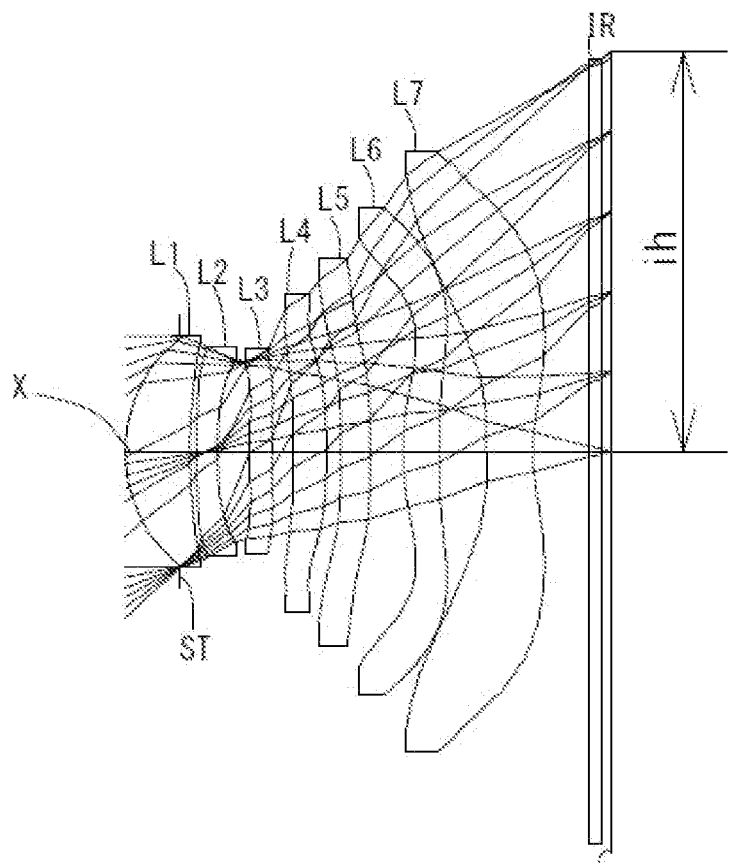
FIG. 5 is a schematic view showing an imaging lens in Example 3 according to the present invention.

The fourth lens L4 may be formed in a meniscus shape having the object-side surface being concave and the image-side surface being convex in a paraxial region (near the optical axis X) as in the Examples 2 and 3 shown in FIGS. 3 and 5. In this case, a light ray incident angle to the fourth lens L4 can be appropriately controlled, and the astigmatism and the distortion can be properly corrected. Furthermore, the fourth lens L4 may be formed in a meniscus shape having the object-side surface being convex and the image-side surface being concave in a paraxial region (near the optical axis X) as in the Examples 4, 5 and 6 shown in FIGS. 7, 9 and 11. In this case, the astigmatism and the distortion can be properly corrected.

Figure 7:
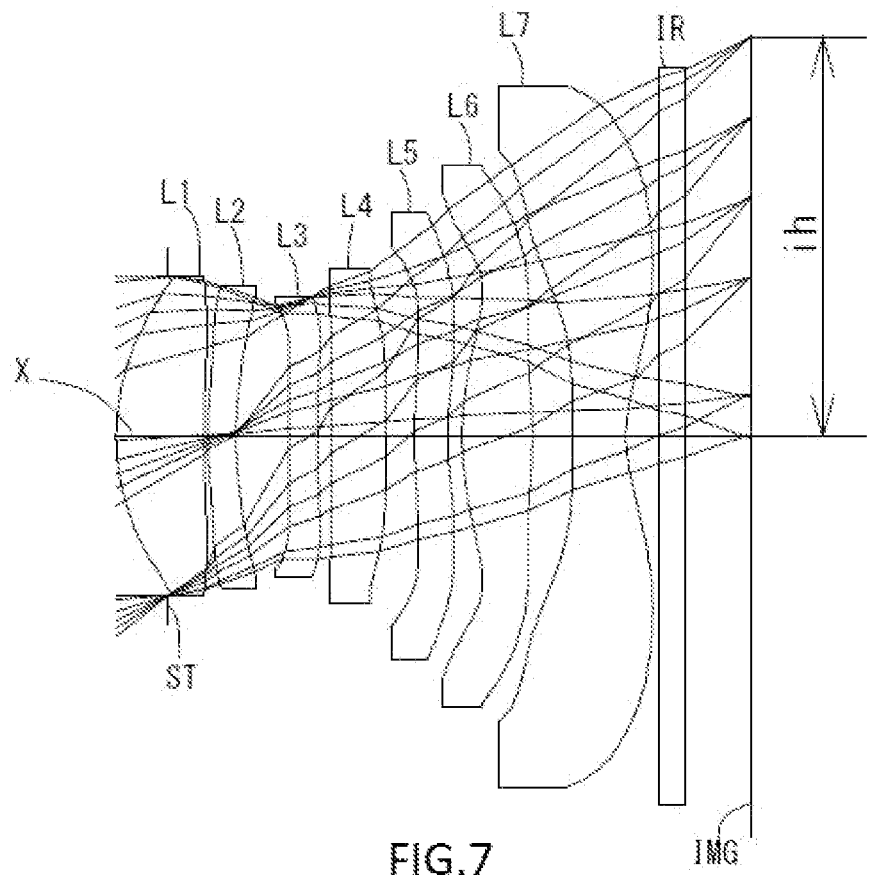
FIG. 7 is a schematic view showing an imaging lens in Example 4 according to the present invention.
Figure 11:
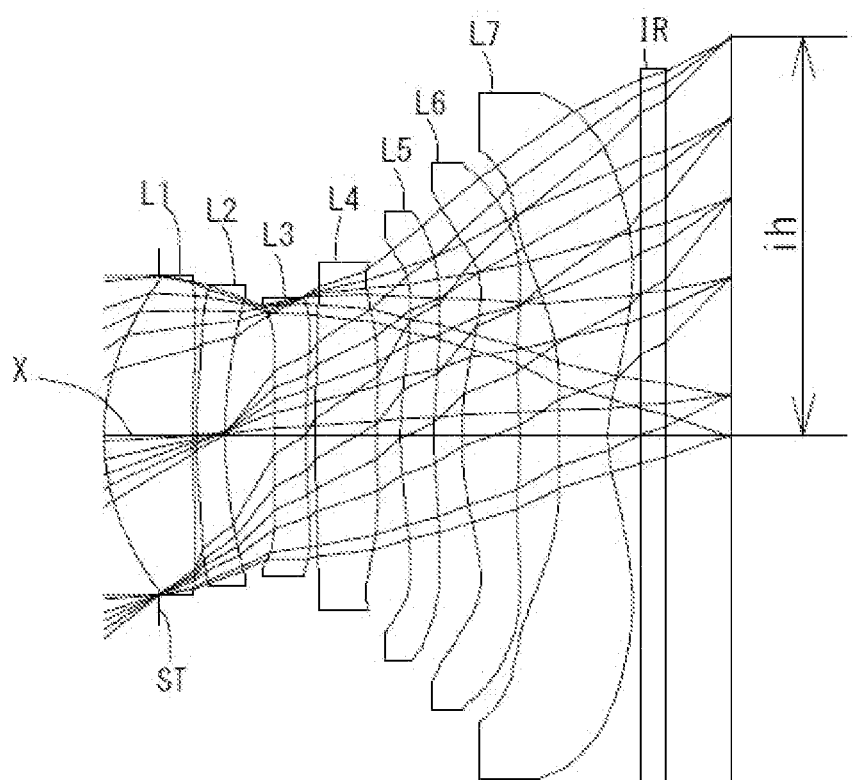
FIG. 11 is a schematic view showing an imaging lens in Example 6 according to the present invention.

Additionally, the fourth lens L4 may have negative refractive power as in the Examples 4 and 6 shown in FIGS. 7 and 11. In this case, correction of the chromatic aberration is favorably made.

The fifth lens L5 is formed in a shape having an object-side surface and an image-side surface which are plane in a paraxial region (near the optical axis X), and substantially has no refractive power in the paraxial region. Therefore, the astigmatism, the field curvature and the distortion at a peripheral area can be properly corrected by aspheric surfaces on both sides without affecting a focal length of the overall optical system of the imaging lens.

The fifth lens L5 may be formed in a meniscus shape having the object-side surface being concave and the image-side surface being convex in a paraxial region (near the optical axis X) as in the Examples 2 and 3 shown in FIGS. 3 and 5. In this case, a light ray incident angle to the fifth lens L5 can be appropriately controlled, and the astigmatism and the distortion can be properly corrected. Furthermore, the fifth lens L5 may be formed in a meniscus shape having the object-side surface being convex and the image-side surface being concave in a paraxial region (near the optical axis X) as in the Examples 4, 5 and 6 shown in FIGS. 7, 9 and 11. In this case, the astigmatism, the field curvature and the distortion can be properly corrected.

Additionally, the fifth lens L5 may have positive refractive power as in the Example 6 shown in FIG. 11. In this case, it becomes favorable for reducing the profile.

The sixth lens L6 has the positive refractive power and is formed in a biconvex shape having an object-side surface being convex and an image-side surface being convex in a paraxial region (near the optical axis X). Therefore, reduction in the profile is achieved and the coma aberration, the astigmatism, the field curvature and the distortion are properly corrected by positive refractive powers on the both sides. Furthermore, when the both-side surfaces are convex, curvatures are suppressed from being large, and sensitivity to a manufacturing error can be reduced.

The sixth lens L6 may be formed in a meniscus shape having the object-side surface being convex and the image-side surface being concave in a paraxial region (near the optical axis X) as in the Examples 2 and 3 shown in FIGS. 3 and 5. In this case, the coma aberration, the astigmatism, the field curvature and the distortion can be properly corrected.

The object-side surface of the sixth lens L6 is formed as an aspheric surface having at least one pole point in the position off the optical axis X. Therefore, the astigmatism, the field curvature and the distortion are more properly corrected.

The seventh lens L7 has the negative refractive power and is formed in a biconcave shape having an object-side surface and an image-side surface being both concave in a paraxial region (near the optical axis X). Therefore, the chromatic aberration, the astigmatism, the field curvature and the distortion are properly corrected. Furthermore, when the image-side surface is concave in the paraxial region, the reduction in the profile is maintained and a back focus is secured.

The object-side surface of the seventh lens L7 is formed as an aspheric surface having at least one pole point in the position off the optical axis X. Therefore, the astigmatism, the field curvature and the distortion are more properly corrected.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (22).

$$0.55 < vd2/vd3 < 1.50 \tag{1}$$

$$0.30 < r2/f < 2.70 \tag{2}$$

$$1.85 < |r13|/f \tag{3}$$

$$0.65 < T2/T4 < 3.00 \tag{4}$$

$$f3/f < -3.50 \tag{5}$$

$$0.60 < r4/f < 1.20 \tag{6}$$

$$1.50 < |r5|/f < 6.80 \tag{7}$$

$$0.90 < |r6|/f < 9.00 \tag{8}$$

$$9.00 < vd3 < 39.00 \tag{9}$$

$$9.00 < vd5 < 39.00 \tag{10}$$

$$0.40 < (T1/TTL) \times 100 < 1.80 \tag{11}$$

$$1.85 < (T4/TTL) \times 100 < 8.00 \tag{12}$$

$$0.03 < T1/T2 < 0.25 \tag{13}$$

$$0.25 < r2/r3 < 2.00 \tag{14}$$

$$0.15 < |r6/r7| < 3.20 \tag{15}$$

$$1.75 < |r7|/f \tag{16}$$

$$0.20 < r11/f < 1.75 \tag{17}$$

$$0.45 < |r12|/f < 20.50 \tag{18}$$

$$0.60 < D1/bf < 1.20 \tag{19}$$

$$0.40 < D4/T4 < 3.50 \tag{20}$$

$$0.20 < D4/D7 < 1.65 \tag{21}$$

$$1.90 < |f4|/f \tag{22}$$

where
vd2: an abbe number at d-ray of the second lens L2,
vd3: an abbe number at d-ray of the third lens L3,
vd5: an abbe number at d-ray of the fifth lens L5,
D1: a thickness of the first lens L1 along the optical axis X,
D4: a thickness of the fourth lens L4 along the optical axis X,
D7: a thickness of the seventh lens L7 along the optical axis X,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T4: a distance along the optical axis X from an image-side surface of the fourth lens L4 to an object-side surface of the fifth lens L5,
f: a focal length of the overall optical system of the imaging lens,
TTL: a total track length,
bf: a back focus,
f3: a focal length of the third lens L3,
f4: a focal length of the fourth lens L4,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r7: a paraxial curvature radius of an object-side surface of the fourth lens L4,
r11: a paraxial curvature radius of an object-side surface of the sixth lens L6,
r12: a paraxial curvature radius of an image-side surface of the sixth lens L6, and
r13: a paraxial curvature radius of an object-side surface of the seventh lens L7.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (22a).

$0.65 < vd2/vd3 < 1.25$ (1a)

$0.75 < r2/f < 2.20$ (2a)

$2.30 < |r13|/f < 16.00$ (3a)

$0.95 < T2/T4 < 2.60$ (4a)

$-60.00 < f3/f < -5.00$ (5a)

$0.70 < r4/f < 1.05$ (6a)

$1.80 < |r5|/f < 5.50$ (7a)

$1.40 < |r6|/f < 8.00$ (8a)

$14.00 < vd3 < 32.00$ (9a)

$14.00 < vd5 < 32.00$ (10a)

$0.50 < (T1/TTL) \times 100 < 1.55$ (11a)

$2.45 < (T4/TTL) \times 100 < 7.00$ (12a)

$0.05 < T1/T2 < 0.22$ (13a)

$0.35 < r2/r3 < 1.75$ (14a)

$0.20 < |r6/r7| < 2.80$ (15a)

$2.15 < |r7|/f < 15.00$ (16a)

$0.40 < r11/f < 1.55$ (17a)

$0.60 < |r12|/f < 17.00$ (18a)

$0.70 < D1/bf < 1.05$ (19a)

$0.75 < D4/T4 < 3.05$ (20a)

$0.40 < D4/D7 < 1.45$ (21a)

$2.25 < |f4|/f < 165.00$ (22a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$

[Equation 1]

Next, examples of the imaging lens according to this embodiment will be explained. In each example, f denotes a focal length of the overall optical system of the imaging lens, Fno denotes a F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 5.99
Fno = 1.85
ω(°) = 42.5
ih = 5.60
TTL = 6.64
Surface Data

| i | r | d | Nd | vd | |
|---|---|---|---|---|---|
| (Object) | Infinity | Infinity | | | |
| 1 (Stop) | Infinity | −0.7460 | | | |
| 2* | 2.0200 | 0.8927 | 1.544 | 55.93 | (vd1) |
| 3* | 6.8631 | 0.0606 | | | |
| 4* | 13.7704 | 0.3000 | 1.671 | 19.24 | (vd2) |
| 5* | 5.5147 | 0.4194 | | | |
| 6* | 12.8088 | 0.3037 | 1.671 | 19.24 | (vd3) |
| 7* | 10.9872 | 0.2674 | | | |
| 8* | 43.8565 | 0.3710 | 1.544 | 55.93 | (vd4) |
| 9* | −29.9920 | 0.3436 | | | |
| 10* | Infinity | 0.4133 | 1.614 | 25.59 | (vd5) |
| 11* | Infinity | 0.4815 | | | |
| 12* | 8.0376 | 0.5157 | 1.535 | 55.69 | (vd6) |
| 13* | −11.2188 | 0.6195 | | | |
| 14* | −18.2021 | 0.6402 | 1.535 | 55.69 | (vd7) |
| 15* | 2.4793 | 0.4500 | | | |
| 18 | Infinity | 0.2100 | 1.517 | 64.20 | |
| 19 | Infinity | 0.4189 | | | |
| Image Plane | Infinity | | | | |

TABLE 1-continued

Example 1
Unit mm
f = 5.99
Fno = 1.85
ω(°) = 42.5
ih = 5.60
TTL = 6.64
Surface Data Constituent Lens Data

| Lens | Start Surface | Focal Length | | Back Focus |
|---|---|---|---|---|
| 1 | 2 | 4.938 | bf | 1.007 |
| 2 | 4 | −13.917 | | |
| 3 | 6 | −123.443 | | |
| 4 | 8 | 32.782 | | |
| 5 | 10 | Infinity | | |
| 6 | 12 | 8.838 | | |
| 7 | 14 | −4.037 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | −1.897390E−01 | −1.004923E+01 | 0.000000E+00 | 0.000000E+00 | 0.000000E+00 | 0.000000E+00 | 0.000000E+00 |
| A4 | −3.403957E−02 | −1.445157E−02 | −1.943312E−02 | −9.347567E−03 | 7.131241E−03 | −5.016306E−02 | 1.076671E−02 |
| A6 | 1.339093E−01 | −5.327979E−02 | −2.849413E−02 | 9.128225E−02 | −2.891398E−01 | 8.871529E−02 | −7.765582E−02 |
| A8 | −2.679514E−01 | 1.790552E−01 | 1.950621E−01 | −1.753665E−01 | 1.004019E+00 | −2.889650E−01 | 1.070230E−01 |
| A10 | 3.331874E−01 | −2.637550E−01 | −3.651538E−01 | 2.619365E−01 | −2.105216E+00 | 5.424434E−01 | −9.144181E−02 |
| A12 | −2.630081E−01 | 2.301107E−01 | 3.859427E−01 | −2.583123E−01 | 2.754117E+00 | −6.270030E−01 | 5.049119E−02 |
| A14 | 1.322542E−01 | −1.253997E−01 | −2.486261E−01 | 1.620674E−01 | −2.266826E+00 | 4.520646E−01 | −1.727036E−02 |
| A16 | −4.107038E−02 | 4.240644E−02 | 9.702401E−02 | −5.859297E−02 | 1.139700E+00 | −1.977791E−01 | 3.501469E−03 |
| A18 | 7.187197E−03 | −8.223618E−03 | −2.103989E−02 | 9.911676E−03 | −3.195175E−01 | 4.807883E−02 | −3.848544E−04 |
| A20 | −5.451942E−04 | 6.986180E−04 | 1.938348E−03 | −2.350152E−04 | 3.830912E−02 | −4.973947E−03 | 1.745000E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 0.000000E+00 | 0.000000E+00 | 0.000000E+00 | 0.000000E+00 | −1.073273E+01 |
| A4 | 3.781598E−02 | 6.180126E−02 | 4.191225E−02 | 3.944219E−02 | 3.790054E−02 | −1.094890E−01 | −5.443553E−02 |
| A6 | −1.153633E−01 | −1.239703E−01 | −8.074851E−02 | −4.602305E−02 | −2.833472E−02 | 3.113214E−02 | 1.641538E−02 |
| A8 | 1.334181E−01 | 1.063273E−01 | 5.505381E−02 | 2.158792E−02 | 1.178912E−02 | −1.666118E−03 | −2.967208E−03 |
| A10 | −9.872242E−02 | −5.777258E−02 | −2.239962E−02 | −7.092310E−03 | −2.966539E−03 | −7.889285E−04 | 3.437877E−04 |
| A12 | 4.777827E−02 | 2.017964E−02 | 5.878898E−03 | 1.624919E−03 | 4.617888E−04 | 1.911197E−04 | −2.780548E−05 |
| A14 | −1.446810E−02 | −4.432580E−03 | −9.888127E−04 | −2.489823E−04 | −4.482551E−05 | −2.012228E−05 | 1.621601E−06 |
| A16 | 2.618651E−03 | 5.867283E−04 | 1.020781E−04 | 2.384480E−05 | 2.610423E−06 | 1.153222E−06 | −6.847407E−08 |
| A18 | −2.587961E−04 | −4.248196E−05 | −5.861663E−06 | −1.269815E−06 | −8.171509E−08 | −3.510512E−08 | 1.937668E−09 |
| A20 | 1.074579E−05 | 1.284399E−06 | 1.429945E−07 | 2.843021E−08 | 1.023464E−09 | 4.461858E−10 | −2.683160E−11 |

The imaging lens in Example 1 satisfies conditional expressions (1) to (22) as shown in Table 7.

Figure 1:
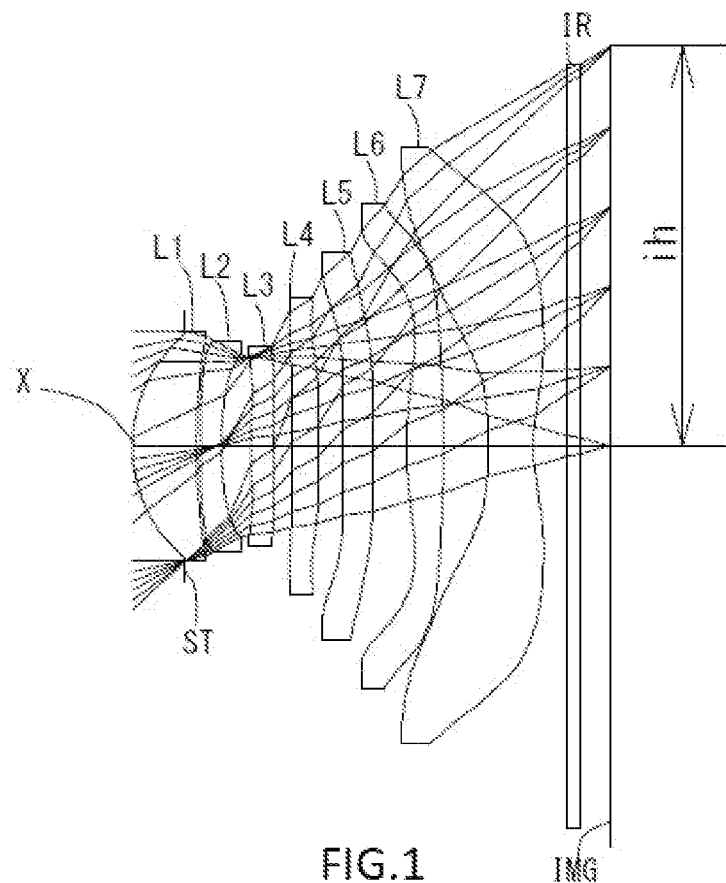
FIG. 1 is a schematic view showing an imaging lens in Example 1 according to the present invention.
Figure 2:
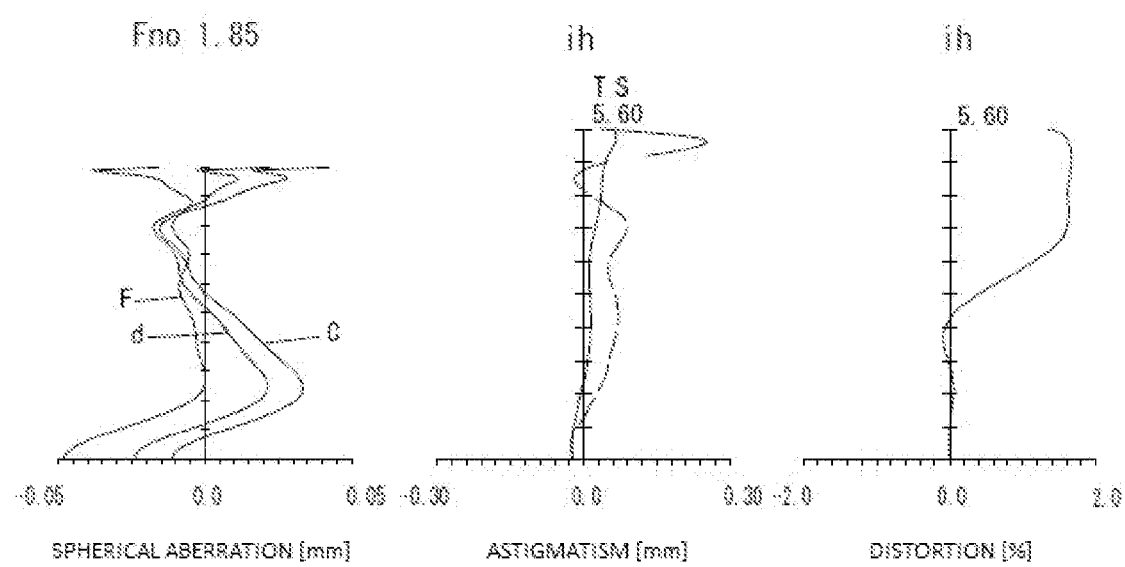
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10 and 12). As shown in FIG. 2, each aberration is corrected excellently.

Example 2

The basic lens data is shown below in Table 2.

TABLE 2

Example 2
Unit mm
f = 6.00
Fno = 1.85
ω(°) = 42.5
ih = 5.60
TTL = 6.73
Surface Data

| i | r | d | Nd | vd | |
|---|---|---|---|---|---|
| (Object) | Infinity | Infinity | | | |
| 1 (Stop) | Infinity | −0.7346 | | | |
| 2* | 2.0991 | 0.9006 | 1.544 | 55.86 | (vd1) |
| 3* | 7.7551 | 0.0877 | | | |
| 4* | 14.2730 | 0.3000 | 1.671 | 19.24 | (vd2) |

TABLE 2-continued

Example 2
Unit mm
f = 6.00
Fno = 1.85
ω(°) = 42.5
ih = 5.60
TTL = 6.73
Surface Data

| | | | | | |
|---|---|---|---|---|---|
| 5* | 5.6046 | 0.4632 | | | |
| 6* | 17.2323 | 0.3024 | 1.671 | 19.24 | (vd3) |
| 7* | 14.6493 | 0.3266 | | | |
| 8* | −15.2860 | 0.5154 | 1.544 | 55.86 | (vd4) |
| 9* | −5.6101 | 0.2071 | | | |
| 10* | −7.7429 | 0.3500 | 1.614 | 25.58 | (vd5) |
| 11* | −13.3466 | 0.4727 | | | |
| 12* | 4.3358 | 0.4936 | 1.535 | 55.66 | (vd6) |
| 13* | 26.3323 | 0.8144 | | | |
| 14* | −46.2684 | 0.4885 | 1.535 | 55.66 | (vd7) |
| 15* | 2.4126 | 0.5000 | | | |
| 18 | Infinity | 0.2100 | 1.517 | 64.20 | |
| 19 | Infinity | 0.3733 | | | |
| Image Plane | Infinity | | | | |

Constituent Lens Data

| Lens | Start Surface | Focal Length | | Back Focus |
|---|---|---|---|---|
| 1 | 2 | 5.007 | bf | 1.012 |
| 2 | 4 | −13.952 | | |
| 3 | 6 | −152.889 | | |
| 4 | 8 | 15.983 | | |
| 5 | 10 | −30.756 | | |
| 6 | 12 | 9.630 | | |
| 7 | 14 | −4.273 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | −8.659805E−03 | −2.115791E−02 | −2.394471E−02 | 6.776405E−04 | −3.401783E−02 | −3.150289E−02 | 2.276415E−02 |
| A6 | 3.984680E−02 | −6.924930E−03 | 1.566713E−02 | 6.732392E−03 | −7.323921E−02 | −3.764940E−02 | −1.005609E−01 |
| A8 | −8.600588E−02 | 6.110782E−02 | 4.911377E−02 | 8.270538E−02 | 1.925657E−01 | 5.750398E−02 | 1.310412E−01 |
| A10 | 1.160771E−01 | −1.038780E−01 | −1.107711E−01 | −2.261395E−01 | −3.216354E−01 | −4.624596E−02 | −1.130312E−01 |
| A12 | −9.941662E−02 | 1.016046E−01 | 1.233596E−01 | 3.367440E−01 | 3.491313E−01 | 1.429590E−02 | 6.447965E−02 |
| A14 | 5.436623E−02 | −6.193053E−02 | −8.244983E−02 | −3.042983E−01 | −2.500637E−01 | 6.285879E−03 | −2.267655E−02 |
| A16 | −1.840820E−02 | 2.308273E−02 | 3.327145E−02 | 1.664197E−01 | 1.142403E−01 | −6.722787E−03 | 4.684227E−03 |
| A18 | 3.520965E−03 | −4.798549E−03 | −7.414933E−03 | −5.053824E−02 | −3.004843E−02 | 2.128183E−03 | −5.206481E−04 |
| A20 | −2.922635E−04 | 4.228235E−04 | 6.973783E−04 | 6.597329E−03 | 3.468647E−03 | −2.402540E−04 | 2.396016E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 1.575631E+01 | 0.000000E+00 | 0.000000E+00 | 0.000000E+00 | −1.234749E+01 |
| A4 | 9.660862E−02 | 1.181149E−01 | 3.742618E−02 | 7.230874E−03 | 3.385297E−02 | −1.222202E−01 | −5.749816E−02 |
| A6 | −2.078428E−01 | −2.250105E−01 | −1.094823E−01 | −3.384261E−02 | −1.796568E−02 | 6.226629E−02 | 2.176425E−02 |
| A8 | 1.938508E−01 | 1.806097E−01 | 8.767225E−02 | 1.737918E−02 | 3.902453E−03 | −1.789503E−02 | −4.977587E−03 |
| A10 | −1.154473E−01 | −8.531582E−02 | −3.790016E−02 | −6.283319E−03 | −6.720338E−04 | 3.067764E−03 | 6.708940E−04 |
| A12 | 4.604788E−02 | 2.614711E−02 | 1.021021E−02 | 1.581934E−03 | 9.416346E−05 | −3.254921E−04 | −5.386425E−05 |
| A14 | −1.176352E−02 | −5.263986E−03 | −1.756486E−03 | −2.679972E−04 | −1.043472E−05 | 2.170097E−05 | 2.455177E−06 |
| A16 | 1.818205E−03 | 6.700304E−04 | 1.869092E−04 | 2.864472E−05 | 8.337239E−07 | −8.883978E−07 | −5.285235E−08 |
| A18 | −1.540798E−04 | −4.870267E−05 | −1.117287E−05 | −1.709518E−06 | −3.927643E−08 | 2.045422E−08 | 1.014102E−10 |
| A20 | 5.470000E−06 | 1.534326E−06 | 2.861525E−07 | 4.286808E−08 | 7.783790E−10 | −2.030599E−10 | 9.927600E−12 |

The imaging lens in Example 2 satisfies conditional expressions (1) to (22) as shown in Table 7.

Figure 4:
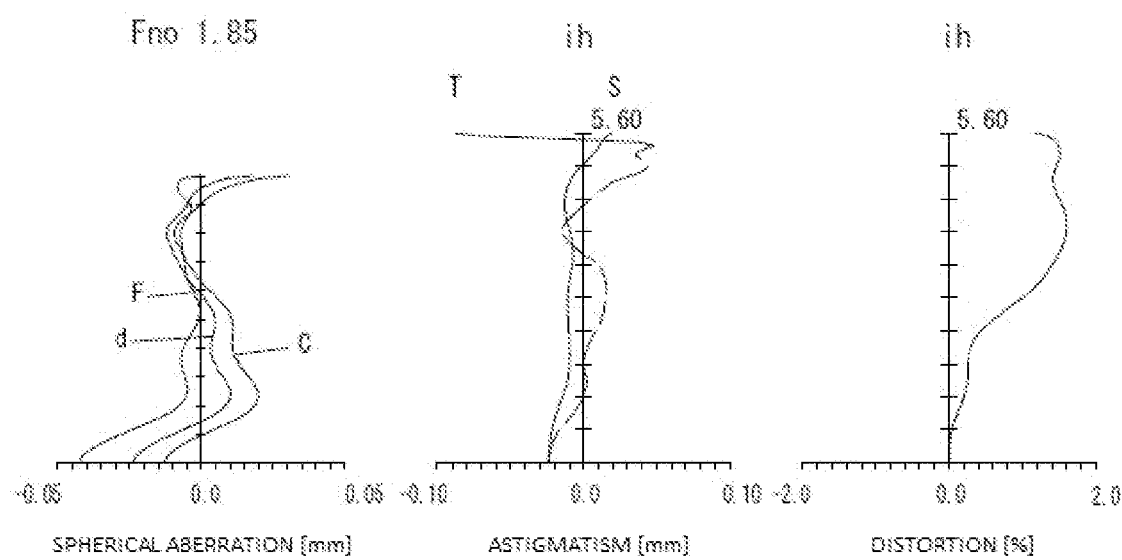
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 6.00
Fno = 1.85
ω(°) = 42.5
ih = 5.60
TTL = 6.73
Surface Data

| i | r | d | Nd | vd | |
|---|---|---|---|---|---|
| (Object) | Infinity | Infinity | | | |
| 1 (Stop) | Infinity | −0.7649 | | | |
| 2* | 2.0741 | 0.9053 | 1.544 | 55.86 | (vd1) |
| 3* | 6.8380 | 0.0844 | | | |
| 4* | 9.4830 | 0.3000 | 1.671 | 19.24 | (vd2) |
| 5* | 4.8541 | 0.4558 | | | |
| 6* | 13.6257 | 0.3068 | 1.671 | 19.24 | (vd3) |
| 7* | 12.4150 | 0.2978 | | | |
| 8* | −24.4084 | 0.4689 | 1.544 | 55.86 | (vd4) |
| 9* | −6.5781 | 0.2079 | | | |
| 10* | −9.0141 | 0.3994 | 1.671 | 19.24 | (vd5) |
| 11* | −15.9057 | 0.4746 | | | |
| 12* | 4.9797 | 0.5056 | 1.535 | 55.66 | (vd6) |
| 13* | 81.5273 | 0.6542 | | | |
| 14* | −63.8017 | 0.6500 | 1.535 | 55.66 | (vd7) |
| 15* | 2.3801 | 0.7677 | | | |
| 18 | Infinity | 0.2100 | 1.517 | 64.20 | |
| 19 | Infinity | 0.1179 | | | |
| Image Plane | Infinity | | | | |

Constituent Lens Data

| Lens | Start Surface | Focal Length | | Back Focus |
|---|---|---|---|---|
| 1 | 2 | 5.126 | bf | 1.024 |
| 2 | 4 | −15.222 | | |
| 3 | 6 | −231.900 | | |
| 4 | 8 | 16.392 | | |
| 5 | 10 | −31.756 | | |
| 6 | 12 | 9.894 | | |
| 7 | 14 | −4.276 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | −9.150742E−03 | −1.935426E−02 | −3.018013E−02 | −3.811334E−03 | −2.800410E−02 | −3.014295E−02 | 3.019231E−02 |
| A6 | 4.049141E−02 | −3.348826E−02 | 9.220281E−03 | 1.603758E−02 | −7.657328E−02 | −2.134739E−02 | −1.129202E−01 |
| A8 | −8.731692E−02 | 1.318769E−01 | 7.337861E−02 | 4.989992E−02 | 1.902288E−01 | 4.407642E−03 | 1.451732E−01 |
| A10 | 1.192862E−01 | −2.092355E−01 | −1.491288E−01 | −1.432832E−01 | −2.877850E−01 | 4.942049E−02 | −1.194406E−01 |
| A12 | −1.040792E−01 | 1.984865E−01 | 1.606020E−01 | 2.094367E−01 | 2.661115E−01 | −9.330147E−02 | 6.421202E−02 |
| A14 | 5.808425E−02 | −1.177012E−01 | −1.052038E−01 | −1.828910E−01 | −1.505095E−01 | 8.215917E−02 | −2.156607E−02 |
| A16 | −2.004009E−02 | 4.264877E−02 | 4.174606E−02 | 9.672251E−02 | 4.902664E−02 | −3.958092E−02 | 4.329875E−03 |
| A18 | 3.892169E−03 | −8.614908E−03 | −9.162730E−03 | −2.853416E−02 | −7.694755E−03 | 1.013245E−02 | −4.751641E−04 |
| A20 | −3.259019E−04 | 7.392554E−04 | 8.481002E−04 | 3.676668E−03 | 3.344298E−04 | −1.077323E−03 | 2.193501E−05 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 1.640000E+01 | 0.000000E+00 | 0.000000E+00 | 0.000000E+00 | −1.090000E+01 |
| A4 | 9.814787E−02 | 1.094561E−01 | 4.632825E−02 | 3.111593E−02 | 4.323965E−02 | −1.091282E−01 | −4.662820E−02 |
| A6 | −2.082760E−01 | −2.074618E−01 | −1.081383E−01 | −4.162420E−02 | −1.784015E−02 | 4.740471E−02 | 1.334122E−02 |
| A8 | 1.952191E−01 | 1.670775E−01 | 8.222513E−02 | 1.842882E−02 | 2.744398E−03 | −1.148147E−02 | −2.163037E−03 |
| A10 | −1.160455E−01 | −7.935525E−02 | −3.455050E−02 | −5.897741E−03 | −1.532936E−04 | 1.744305E−03 | 1.369883E−04 |
| A12 | 4.644636E−02 | 2.433211E−02 | 9.083893E−03 | 1.293129E−03 | −2.159023E−05 | −1.734799E−04 | 9.628293E−06 |
| A14 | −1.204952E−02 | −4.869360E−03 | −1.526586E−03 | −1.836771E−04 | 5.691686E−06 | 1.139949E−05 | −2.405530E−06 |
| A16 | 1.912398E−03 | 6.138619E−04 | 1.590424E−04 | 1.612198E−05 | −5.738720E−07 | −4.794964E−07 | 1.797055E−07 |
| A18 | −1.678893E−04 | −4.420186E−05 | −9.346665E−06 | −7.939241E−07 | 2.849376E−08 | 1.170801E−08 | −6.201218E−09 |
| A20 | 6.235382E−06 | 1.383962E−06 | 2.366816E−07 | 1.675304E−08 | −5.622106E−10 | −1.259539E−10 | 8.345870E−11 |

The imaging lens in Example 3 satisfies conditional expressions (1) to (22) as shown in Table 7.

Figure 6:
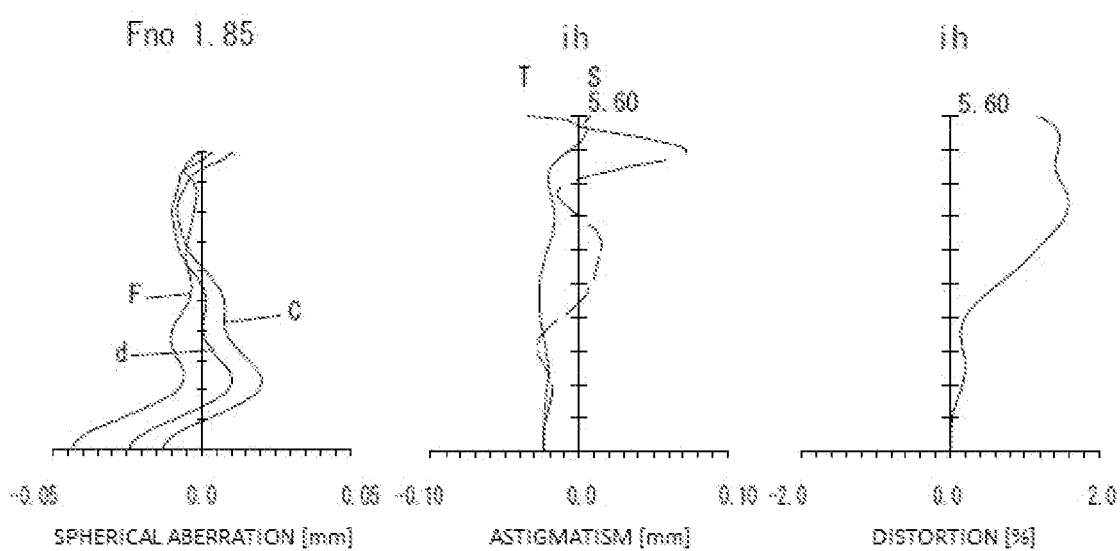
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 3.90
Fno = 1.55
ω(°) = 38.4
ih = 3.15
TTL = 4.94
Surface Data

| i | r | d | Nd | vd | |
|---|---|---|---|---|---|
| (Object) | Infinity | Infinity | | | |
| 1 (Stop) | Infinity | −0.4070 | | | |
| 2* | 1.8620 | 0.6911 | 1.544 | 55.86 | (vd1) |
| 3* | 5.9743 | 0.0351 | | | |
| 4* | 4.3552 | 0.2200 | 1.661 | 20.37 | (vd2) |
| 5* | 3.5663 | 0.4140 | | | |
| 6* | 14.5691 | 0.2300 | 1.671 | 19.24 | (vd3) |
| 7* | 11.2601 | 0.0996 | | | |
| 8* | 18.7418 | 0.4357 | 1.535 | 55.66 | (vd4) |
| 9* | 17.3784 | 0.2290 | | | |
| 10* | 4.3620 | 0.2642 | 1.614 | 25.58 | (vd5) |
| 11* | 2.5984 | 0.1094 | | | |
| 12* | 2.3507 | 0.5592 | 1.535 | 55.66 | (vd6) |
| 13* | −2.9168 | 0.3097 | | | |
| 14* | 11.0000 | 0.4294 | 1.535 | 55.66 | (vd7) |
| 15* | 1.2455 | 0.2500 | | | |
| 18 | Infinity | 0.2100 | 1.517 | 64.20 | |
| 19 | Infinity | 0.5252 | | | |
| Image Plane | Infinity | | | | |

Constituent Lens Data

| Lens | Start Surface | Focal Length | | Back Focus |
|---|---|---|---|---|
| 1 | 2 | 4.692 | bf | 0.914 |
| 2 | 4 | −33.499 | | |
| 3 | 6 | −76.036 | | |
| 4 | 8 | −502.629 | | |
| 5 | 10 | −11.096 | | |
| 6 | 12 | 2.527 | | |
| 7 | 14 | −2.667 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 3.579870E+00 | −1.433916E+00 | 0.000000E+00 | 0.000000E+00 | 0.000000E+00 |
| A4 | −2.879571E−03 | −9.063926E−02 | −8.784637E−02 | 2.208839E−02 | 1.616469E−02 | 8.096085E−02 | −1.475449E−04 |
| A6 | 1.135722E−03 | 1.798202E−02 | −4.313097E−02 | −1.809259E−01 | −1.558701E−01 | −3.934715E−01 | −2.553176E−01 |
| A8 | 3.174250E−03 | −3.042054E−02 | 6.532477E−02 | 3.943992E−01 | 1.345622E−01 | 8.535627E−01 | 6.907474E−01 |
| A10 | −8.396044E−03 | 1.606866E−01 | 1.257429E−01 | −4.743360E−01 | −1.723786E−01 | −1.231386E+00 | −8.857353E−01 |
| A12 | 2.175425E−03 | −2.114925E−01 | −2.310505E−01 | 3.524512E−01 | 8.701926E−02 | 9.451489E−01 | 5.836128E−01 |
| A14 | 7.198892E−04 | 1.128694E−01 | 1.328762E−01 | −1.585439E−01 | −1.448190E−02 | −3.627480E−01 | −1.794432E−01 |
| A16 | −7.206630E−04 | −2.195085E−02 | −2.547925E−02 | 3.302828E−02 | 0.000000E+00 | 5.497897E−02 | 1.827355E−02 |
| A18 | 0.000000E+00 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 | 0.000000E+00 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 0.000000E+00 | −9.500000E+00 | −6.500000E+00 | 0.000000E+00 | −5.996438E+00 |
| A4 | −1.333043E−01 | −1.969999E−01 | −3.011957E−01 | 5.031873E−02 | 2.229059E−01 | −2.694439E−01 | −1.476702E−01 |
| A6 | 1.205376E−01 | 2.771811E−01 | 1.763174E−01 | −1.850231E−01 | −1.865637E−01 | 1.939521E−01 | 1.069773E−01 |
| A8 | −2.788012E−01 | −2.642428E−01 | 1.280361E−01 | 2.797289E−01 | 1.427901E−01 | −1.139643E−01 | −5.883388E−02 |
| A10 | 3.707915E−01 | 1.288321E−01 | −3.690965E−01 | −2.629355E−01 | −1.126600E−01 | 5.925362E−02 | 2.255227E−02 |
| A12 | −2.675485E−01 | −4.710746E−02 | 3.434844E−01 | 1.367848E−01 | 5.868841E−02 | −2.163025E−02 | −5.774777E−03 |
| A14 | 1.064185E−01 | 3.246398E−02 | −1.775710E−01 | −4.116516E−02 | −1.798205E−02 | 4.964881E−03 | 9.612594E−04 |
| A16 | −1.756349E−02 | −2.390043E−02 | 5.386505E−02 | 7.410329E−03 | 3.164477E−03 | −6.819106E−04 | −1.000253E−04 |
| A18 | 0.000000E+00 | 8.775803E−03 | −8.926465E−03 | −7.711893E−04 | −2.980960E−04 | 5.127354E−05 | 5.935884E−06 |
| A20 | 0.000000E+00 | −1.170000E−03 | 6.213651E−04 | 3.695076E−05 | 1.174215E−05 | −1.630154E−06 | −1.543460E−07 |

The imaging lens in Example 4 satisfies conditional expressions (1) to (22) as shown in Table 7.

Figure 8:
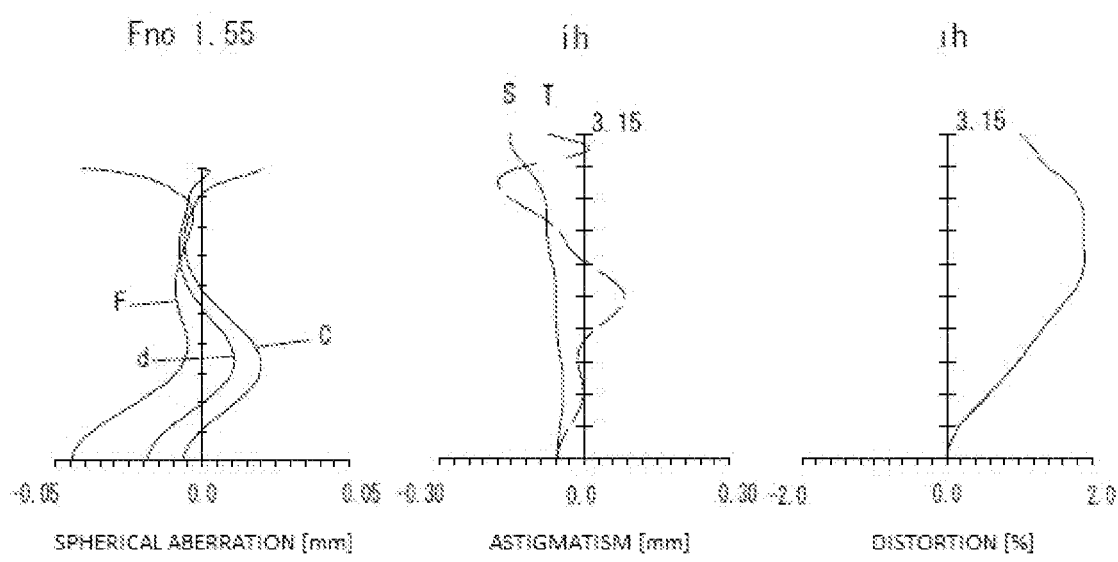
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 4.03
Fno = 1.60
ω(°) = 37.6
ih = 3.15
TTL = 4.98
Surface Data

| i | r | d | Nd | vd | |
|---|---|---|---|---|---|
| (Object) | Infinity | Infinity | | | |
| 1 (Stop) | Infinity | −0.4300 | | | |
| 2* | 1.8567 | 0.7203 | 1.544 | 55.86 | (vd1) |
| 3* | 6.8455 | 0.0300 | | | |
| 4* | 4.7091 | 0.2200 | 1.661 | 20.37 | (vd2) |
| 5* | 3.6151 | 0.4753 | | | |
| 6* | −15.0000 | 0.2200 | 1.614 | 25.58 | (vd3) |
| 7* | −27.0000 | 0.0322 | | | |
| 8* | 11.5529 | 0.4088 | 1.535 | 55.66 | (vd4) |
| 9* | 14.1023 | 0.2893 | | | |
| 10* | 5.0048 | 0.2771 | 1.614 | 25.58 | (vd5) |
| 11* | 2.4466 | 0.0968 | | | |
| 12* | 2.2586 | 0.5485 | 1.535 | 55.66 | (vd6) |
| 13* | −3.1015 | 0.3621 | | | |
| 14* | 12.8981 | 0.4249 | 1.535 | 55.66 | (vd7) |
| 15* | 1.2975 | 0.2500 | | | |
| 18 | Infinity | 0.2100 | 1.517 | 64.20 | |
| 19 | Infinity | 0.4905 | | | |
| Image Plane | Infinity | | | | |

Constituent Lens Data

| Lens | Start Surface | Focal Length | | Back Focus |
|---|---|---|---|---|
| 1 | 2 | 4.454 | bf | 0.879 |
| 2 | 4 | −25.585 | | |
| 3 | 6 | −55.334 | | |
| 4 | 8 | 113.171 | | |
| 5 | 10 | −8.128 | | |
| 6 | 12 | 2.534 | | |
| 7 | 14 | −2.732 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 4.917624E+00 | −7.134696E−01 | 0.000000E+00 | 0.000000E+00 | 0.000000E+00 |
| A4 | 1.833886E−03 | −8.732262E−02 | −8.391951E−02 | 2.383373E−02 | 4.534082E−02 | 1.260953E−01 | 1.041465E−02 |
| A6 | −4.913779E−03 | 2.125968E−02 | −4.338536E−02 | −1.794390E−01 | −1.709044E−01 | −3.974138E−01 | −2.514462E−01 |
| A8 | 8.183591E−03 | −3.183371E−02 | 6.500831E−02 | 3.926720E−01 | 1.394566E−01 | 8.386378E−01 | 6.823617E−01 |
| A10 | −9.315407E−03 | 1.604416E−01 | 1.254239E−01 | −4.722582E−01 | −1.737128E−01 | −1.228592E+00 | −8.869848E−01 |
| A12 | 2.146906E−03 | −2.114603E−01 | −2.309702E−01 | 3.523238E−01 | 8.701916E−02 | 9.466144E−01 | 5.854609E−01 |
| A14 | 7.102429E−04 | 1.128806E−01 | 1.328762E−01 | −1.585439E−01 | −1.448190E−02 | −3.627480E−01 | −1.794432E−01 |
| A16 | −7.206665E−04 | −2.195085E−02 | −2.547925E−02 | 3.302828E−01 | 0.000000E+00 | 5.497897E−02 | 1.827354E−02 |
| A18 | 0.000000E+00 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 | 0.000000E+00 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 0.000000E+00 | −8.023641E+00 | −4.197578E+00 | 0.000000E+00 | −6.235200E+00 |
| A4 | −1.272472E−01 | −1.784512E−01 | −3.018977E−01 | 4.712374E−02 | 2.271820E−01 | −2.710808E−01 | −1.485719E−01 |
| A6 | 1.256989E−01 | 2.741462E−01 | 1.730977E−01 | −1.842467E−01 | −1.876279E−01 | 1.930390E−01 | 1.071019E−01 |
| A8 | −2.795687E−01 | −2.662603E−01 | 1.278980E−01 | 2.796696E−01 | 1.427401E−01 | −1.135356E−01 | −5.878938E−02 |
| A10 | 3.702332E−01 | 1.288454E−01 | −3.690414E−01 | −2.629667E−01 | −1.125943E−01 | 5.918396E−02 | 2.254368E−02 |
| A12 | −2.677071E−01 | −4.686733E−02 | 3.434772E−01 | 1.367791E−01 | 5.869267E−02 | −2.161968E−02 | −5.775004E−03 |
| A14 | 1.063400E−01 | 3.244916E−02 | −1.775737E−01 | −4.116458E−02 | −1.798200E−02 | 4.964981E−03 | 9.612600E−04 |
| A16 | −1.756361E−02 | −2.391384E−02 | 5.386579E−02 | 7.410592E−03 | 3.164421E−03 | −6.819151E−04 | −1.000091E−04 |
| A18 | 0.000000E+00 | 8.778938E−03 | −8.925843E−03 | −7.711494E−04 | −2.981245E−04 | 5.123270E−05 | 5.936511E−06 |
| A20 | 0.000000E+00 | −1.169001E−03 | 6.214357E−04 | 3.695013E−05 | 1.173055E−05 | −1.630996E−06 | −1.545203E−07 |

The imaging lens in Example 5 satisfies conditional expressions (1) to (22) as shown in Table 7.

Figure 10:
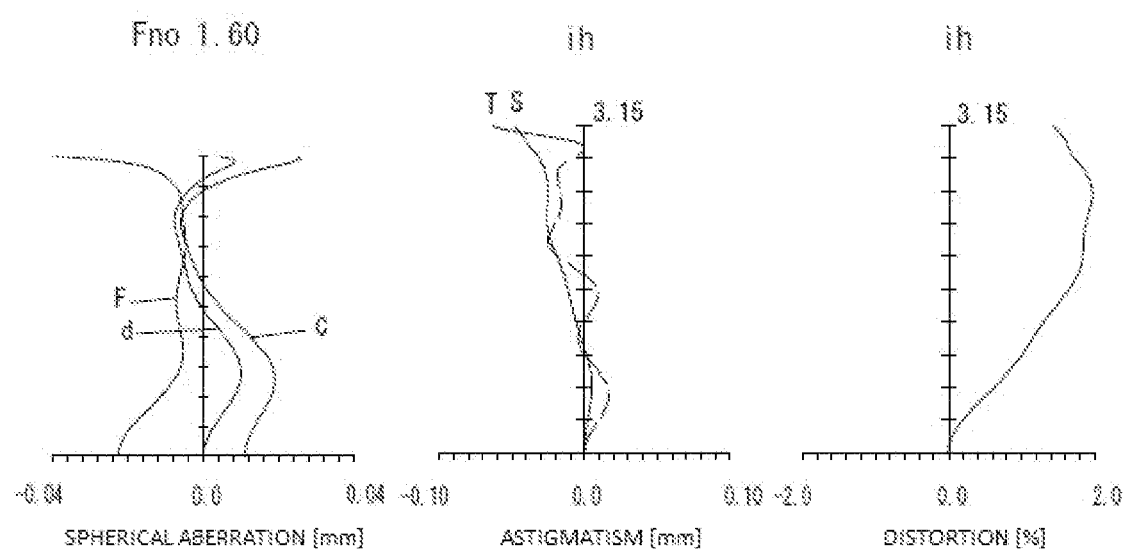
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6
Unit mm
f = 3.91
Fno = 1.55
ω(°) = 38.4
ih = 3.15
TTL = 4.89
Surface Data

| i | r | d | Nd | vd | |
|---|---|---|---|---|---|
| (Object) | Infinity | Infinity | | | |
| 1 (Stop) | Infinity | −0.4310 | | | |
| 2* | 1.8564 | 0.6989 | 1.544 | 55.86 | (vd1) |
| 3* | 5.9410 | 0.0310 | | | |
| 4* | 4.2834 | 0.2248 | 1.661 | 20.37 | (vd2) |
| 5* | 3.4881 | 0.3900 | | | |
| 6* | 16.5755 | 0.2527 | 1.671 | 19.24 | (vd3) |
| 7* | 8.4564 | 0.0704 | | | |
| 8* | 10.1776 | 0.4871 | 1.535 | 55.66 | (vd4) |
| 9* | 9.5154 | 0.1891 | | | |
| 10* | 3.0000 | 0.2637 | 1.614 | 25.58 | (vd5) |
| 11* | 3.1000 | 0.2218 | | | |
| 12* | 2.7124 | 0.4570 | 1.535 | 55.66 | (vd6) |
| 13* | −3.9099 | 0.3148 | | | |
| 14* | 15.0000 | 0.3821 | 1.535 | 55.66 | (vd7) |
| 15* | 1.3010 | 0.2500 | | | |
| 18 | Infinity | 0.2100 | 1.517 | 64.20 | |
| 19 | Infinity | 0.5192 | | | |
| Image Plane | Infinity | | | | |

Constituent Lens Data

| Lens | Start Surface | Focal Length | | Back Focus |
|---|---|---|---|---|
| 1 | 2 | 4.678 | bf | 0.908 |
| 2 | 4 | −32.018 | | |
| 3 | 6 | −26.065 | | |
| 4 | 8 | −367.713 | | |
| 5 | 10 | 75.583 | | |
| 6 | 12 | 3.068 | | |
| 7 | 14 | −2.690 | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 3.851886E+00 | −1.437085E+00 | 0.000000E+00 | 0.000000E+00 | 0.000000E+00 |
| A4 | −1.735334E−03 | −9.140203E−02 | −8.608593E−02 | 2.214169E−02 | 1.586151E−02 | 7.924553E−02 | 7.925303E−03 |
| A6 | −3.444868E−04 | 1.946475E−02 | −4.419597E−02 | −1.790290E−01 | −1.572388E−01 | −3.915451E−01 | −2.569864E−01 |
| A8 | 3.827549E−03 | −2.974838E−02 | 6.410713E−02 | 3.919986E−01 | 1.390015E−01 | 8.552480E−01 | 6.885524E−01 |
| A10 | −7.766692E−03 | 1.604361E−01 | 1.244010E−01 | −4.789131E−01 | −1.697977E−01 | −1.229126E+00 | −8.850485E−01 |
| A12 | 2.181187E−03 | −2.133355E−01 | −2.299623E−01 | 3.567576E−01 | 8.703827E−02 | 9.439110E−01 | 5.834002E−01 |
| A14 | 4.846827E−04 | 1.136457E−01 | 1.329466E−01 | −1.585439E−01 | −1.448160E−02 | −3.627525E−01 | −1.794248E−01 |
| A16 | −7.275807E−04 | −2.195411E−02 | −2.547585E−02 | 3.302828E−02 | 0.000000E+00 | 5.497884E−02 | 1.827390E−02 |
| A18 | 0.000000E+00 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 | 0.000000E+00 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | 0.000000E+00 | −5.639571E+00 | −1.245811E+01 | 0.000000E+00 | −6.276503E+00 |
| A4 | −1.355391E−01 | −2.100938E−01 | −2.657720E−01 | 4.137586E−02 | 2.205649E−01 | −2.620730E−01 | −1.475559E−01 |
| A6 | 1.223620E−01 | 2.854368E−01 | 1.756926E−01 | −1.833764E−01 | −1.875235E−01 | 1.935345E−01 | 1.059189E−01 |
| A8 | −2.798371E−01 | −2.643152E−01 | 1.265331E−01 | 2.798010E−01 | 1.427752E−01 | −1.140371E−01 | −5.872802E−02 |
| A10 | 3.731677E−01 | 1.280272E−01 | −3.692540E−01 | −2.630233E−01 | −1.126370E−01 | 5.926052E−02 | 2.256831E−02 |
| A12 | −2.683335E−01 | −4.724373E−02 | 3.434502E−01 | 1.367640E−01 | 5.869072E−02 | −2.163445E−02 | −5.775061E−03 |
| A14 | 1.063333E−01 | 3.245155E−02 | −1.775731E−01 | −4.116828E−02 | −1.798207E−02 | 4.964629E−03 | 9.610809E−04 |
| A16 | −1.757133E−02 | −2.390180E−02 | 5.386509E−02 | 7.410175E−03 | 3.164386E−03 | −6.820896E−04 | −1.000364E−04 |
| A18 | 0.000000E+00 | 8.776053E−03 | −8.926010E−03 | −7.710423E−04 | −2.981312E−04 | 5.128578E−05 | 5.934290E−06 |
| A20 | 0.000000E+00 | −1.168010E−03 | 6.217370E−04 | 3.702160E−05 | 1.173233E−05 | −1.625805E−06 | −1.542660E−07 |

The imaging lens in Example 6 satisfies conditional expressions (1) to (22) as shown in Table 7.

Figure 12:
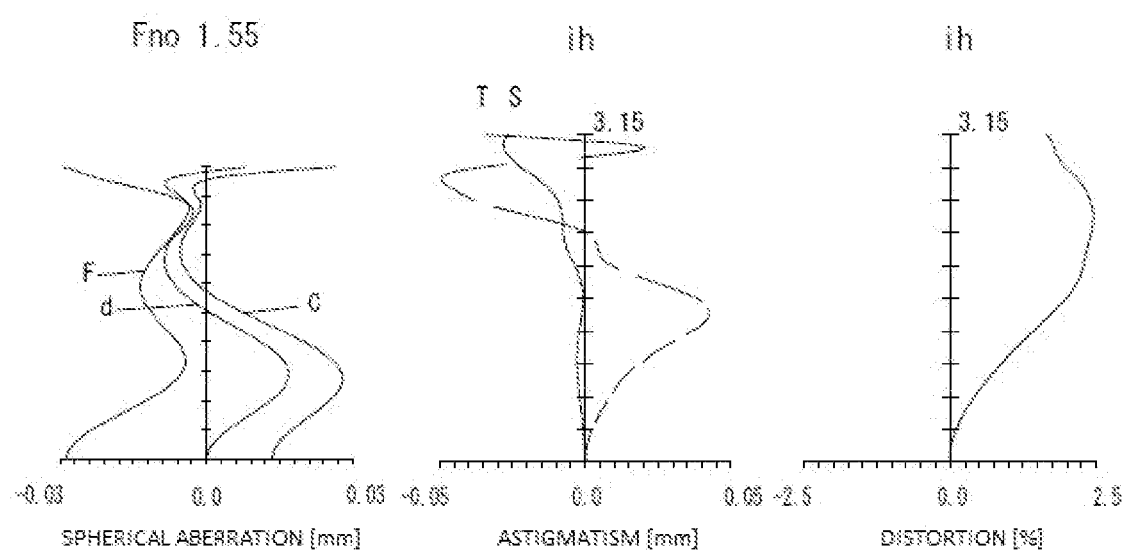
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected excellently.

In table 7, values of conditional expressions (1) to (22) related to the Examples 1 to 6 are shown.

TABLE 7

| Conditional Expressions | Example 1 | Example 2 | Example 3 | Example 4 | Example 5 | Example 6 |
|---|---|---|---|---|---|---|
| (1) vd2/vd3 | 1.00 | 1.00 | 1.00 | 1.06 | 0.80 | 1.06 |
| (2) r2/f | 1.15 | 1.29 | 1.14 | 1.53 | 1.70 | 1.52 |
| (3) \|r13\|/f | 3.04 | 7.71 | 10.63 | 2.82 | 3.20 | 3.83 |
| (4) T2/T4 | 1.22 | 2.24 | 2.19 | 1.81 | 1.64 | 2.06 |
| (5) f3/f | −20.62 | −25.48 | −38.64 | −19.47 | −13.73 | −6.66 |
| (6) r4/f | 0.92 | 0.93 | 0.81 | 0.91 | 0.90 | 0.89 |
| (7) \|r5\|/f | 2.14 | 2.87 | 2.27 | 3.73 | 3.72 | 4.24 |
| (8) \|r6\|/f | 1.84 | 2.44 | 2.07 | 2.88 | 6.70 | 2.16 |
| (9) vd3 | 19.24 | 19.24 | 19.24 | 19.24 | 25.58 | 19.24 |
| (10) vd5 | 25.59 | 25.58 | 19.24 | 25.58 | 25.58 | 25.58 |
| (11) (T1/TTL) × 100 | 0.91 | 1.30 | 1.25 | 0.71 | 0.60 | 0.63 |
| (12) (T4/TTL) × 100 | 5.18 | 3.08 | 3.09 | 4.64 | 5.81 | 3.87 |
| (13) T1/T2 | 0.14 | 0.19 | 0.19 | 0.08 | 0.06 | 0.08 |
| (14) r2/r3 | 0.50 | 0.54 | 0.72 | 1.37 | 1.45 | 1.39 |
| (15) \|r6/r7\| | 0.25 | 0.96 | 0.51 | 0.60 | 2.34 | 0.83 |
| (16) \|r7\|/f | 7.33 | 2.55 | 4.07 | 4.80 | 2.87 | 2.60 |
| (17) r11/f | 1.34 | 0.72 | 0.83 | 0.60 | 0.56 | 0.69 |
| (18) \|r12\|/f | 1.87 | 4.39 | 13.58 | 0.75 | 0.77 | 1.00 |
| (19) D1/bf | 0.89 | 0.89 | 0.88 | 0.76 | 0.82 | 0.77 |
| (20) D4/T4 | 1.08 | 2.49 | 2.26 | 1.90 | 1.41 | 2.58 |
| (21) D4/D7 | 0.58 | 1.05 | 0.72 | 1.01 | 0.96 | 1.27 |
| (22) \|f4\|/f | 5.48 | 2.66 | 2.73 | 128.72 | 28.08 | 93.99 |

When the imaging lens according to the present invention is adopted to a product with the camera function, there is realized contribution to low-profileness and low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane

What is claimed is:

1. An imaging lens comprising, in order from an object side to an image side,
a first lens with positive refractive power having a convex object-side surface in a paraxial region,
a second lens with negative refractive power in a paraxial region,
a third lens with negative refractive power in a paraxial region,
a fourth lens with positive or negative refractive power in a paraxial region,
a fifth lens,
a sixth lens with positive refractive power, and having a convex object-side surface, in a paraxial region, and
a seventh lens with negative refractive power having a concave image-side surface in a paraxial region, wherein the following conditional expressions (1), (2) and (3) are satisfied:

$$0.55 < vd2/vd3 < 1.50 \qquad (1)$$

$$0.30 < r2/f < 2.70 \qquad (2)$$

$$1.85 < |r13|/f \qquad (3)$$

where
vd2: an abbe number at d-ray of the second lens,
vd3: an abbe number at d-ray of the third lens,
r2: a paraxial curvature radius of an image-side surface of the first lens,
f: a focal length of the overall optical system of the imaging lens, and
r13: a paraxial curvature radius of an object-side surface of the seventh lens.

2. The imaging lens according to claim 1, wherein the following conditional expression (5) is satisfied:

$$f3/f < -3.50 \qquad (5)$$

where
f3: a focal length of the third lens, and
f: a focal length of the overall optical system of the imaging lens.

3. The imaging lens according to claim 1, wherein the following conditional expression (6) is satisfied:

$$0.60 < r4/f < 1.20 \qquad (6)$$

where
r4: a paraxial curvature radius of an image-side surface of the second lens, and
f: a focal length of the overall optical system of the imaging lens.

4. The imaging lens according to claim 1, wherein the following conditional expression (7) is satisfied:

$$1.50 < |r5|/f < 6.80 \qquad (7)$$

where
r5: a paraxial curvature radius of an object-side surface of the third lens, and
f: a focal length of the overall optical system of the imaging lens.

5. The imaging lens according to claim 1, wherein the following conditional expression (8) is satisfied:

$$0.90 < |r6|/f < 9.00 \qquad (8)$$

where r6: a paraxial curvature radius of an image-side surface of the third lens, and f: a focal length of the overall optical system of the imaging lens.

6. An imaging lens comprising, in order from an object side to an image side,
- a first lens with positive refractive power having a convex object-side surface in a paraxial region,
- a second lens with negative refractive power in a paraxial region,
- a third lens with negative refractive power in a paraxial region,
- a fourth lens with positive or negative refractive power in a paraxial region,
- a fifth lens,
- a sixth lens with positive refractive power in a paraxial region, and
- a seventh lens with negative refractive power having a concave image-side surface in a paraxial region, wherein the following conditional expressions (1), (2), (3), and (4) are satisfied:

$$0.55 < vd2/vd3 < 1.50 \quad (1)$$

$$0.30 < r2/f < 2.70 \quad (2)$$

$$1.85 < |r13|/f \quad (3)$$

$$0.65 < T2/T4 < 3.00 \quad (4)$$

where vd2: an abbe number at d-ray of the second lens, vd3: an abbe number at d-ray of the third lens, r2: a paraxial curvature radius of an image-side surface of the first lens, f: a focal length of the overall optical system of the imaging lens, r13: a paraxial curvature radius of an object-side surface of the seventh lens, T2: a distance along an optical axis from an image-side surface of the second lens to an object-side surface of the third lens, and T4: a distance along an optical axis from an image-side surface of the fourth lens to an object-side surface of the fifth lens.

* * * * *